United States Patent
Choi et al.

(10) Patent No.: US 11,195,628 B2
(45) Date of Patent: Dec. 7, 2021

(54) METHOD OF MANUFACTURING A CORROSION-RESISTANT ZIRCONIUM ALLOY FOR A NUCLEAR FUEL CLADDING TUBE

(71) Applicant: KEPCO NUCLEAR FUEL CO., LTD., Daejeon (KR)

(72) Inventors: Min Young Choi, Daejeon (KR); Yong Kyoon Mok, Daejeon (KR); Yoon Ho Kim, Daejeon (KR); Yeon Soo Na, Daejeon (KR); Chung Yong Lee, Daejeon (KR); Hun Jang, Sejong-si (KR); Tae Sik Jung, Daejeon (KR); Dae Gyun Go, Daejeon (KR); Sung Yong Lee, Daejeon (KR); Seung Jae Lee, Daejeon (KR); Jae Ik Kim, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 87 days.

(21) Appl. No.: 16/677,904

(22) Filed: Nov. 8, 2019

(65) Prior Publication Data
US 2020/0075181 A1  Mar. 5, 2020

Related U.S. Application Data

(62) Division of application No. 15/097,341, filed on Apr. 13, 2016, now abandoned.

(30) Foreign Application Priority Data

Apr. 14, 2015  (KR) .................. 10-2015-0052710

(51) Int. Cl.
*G21C 3/07*  (2006.01)
*C22C 16/00*  (2006.01)
(Continued)

(52) U.S. Cl.
CPC ............... *G21C 3/07* (2013.01); *B22D 7/005* (2013.01); *B22D 21/005* (2013.01); *C22C 16/00* (2013.01);
(Continued)

(58) Field of Classification Search
CPC .................. G21C 3/07; C22C 16/00
See application file for complete search history.

(56) References Cited

U.S. PATENT DOCUMENTS 4,814,136 A  3/1989  Sabol et al.
5,017,336 A  5/1991  Matsuo et al.
(Continued)

FOREIGN PATENT DOCUMENTS

CN  101117677 A  2/2008
CN  101175864 A  5/2008
(Continued)

OTHER PUBLICATIONS

KR 2009-0092489 machine translation (Year: 2009).*
(Continued)

*Primary Examiner* — Paul A Wartalowicz
*Assistant Examiner* — Stephani Hill
(74) *Attorney, Agent, or Firm* — Rabin & Berdo, P.C.

(57) ABSTRACT

A method of manufacturing a zirconium alloy for a nuclear fuel cladding tube includes melting a mixture of 0.5 wt % of Nb, 0.4 wt % of Mo, 0.1 to 0.15 wt % of Cu, 0.15 to 0.2 wt % of Fe, and a balance of zirconium to prepare a melted ingot; heat treating the melted ingot at 1,000 to 1,050° C. for 30 to 40 min. followed by quenching in water to prepare a heat-treated ingot; preheating the heat-treated ingot at 630 to 650° C. for 20 to 30 min. to prepare a preheated ingot followed by hot rolling the preheated ingot at a reduction ratio of 60 to 65% to provide a hot-rolled material; thrice performing vacuum annealing followed by cold-rolling; and
(Continued)

vacuum annealing a third cold-rolled material in a final vacuum annealing at 510 to 520° C. for 7 to 9 hrs. to provide the zirconium alloy as a cold-rolled material.

1 Claim, 3 Drawing Sheets

(51) Int. Cl.
- *C22F 1/18* (2006.01)
- *G21C 21/10* (2006.01)
- *B22D 7/00* (2006.01)
- *B22D 21/00* (2006.01)

(52) U.S. Cl.
CPC .............. *C22F 1/186* (2013.01); *G21C 21/10* (2013.01); *Y02E 30/30* (2013.01)

(56) References Cited

U.S. PATENT DOCUMENTS

| | | |
|---|---|---|
| 5,024,809 A | 6/1991 | Taylor |
| 5,972,288 A | 10/1999 | Jeong et al. |
| 6,261,516 B1 | 7/2001 | Jeong et al. |
| 6,325,966 B1 | 12/2001 | Jeong et al. |
| 2010/0040189 A1 | 2/2010 | Brachet et al. |
| 2011/0293466 A1 | 12/2011 | Foster et al. |
| 2013/0220493 A1 | 8/2013 | Park et al. |
| 2017/0287578 A1 | 10/2017 | Brachet et al. |

FOREIGN PATENT DOCUMENTS

| | | | |
|---|---|---|---|
| CN | 101935778 A | | 1/2011 |
| CN | 103194650 A | * | 7/2013 |
| CN | 103290262 A | | 9/2013 |
| EP | 1 225 243 A1 | | 7/2002 |
| JP | 01116057 A | * | 5/1989 |
| JP | 08253828 A | * | 10/1996 |
| JP | H 08253828 A | | 10/1996 |
| JP | 2008-144261 A | | 6/2008 |
| KR | 10-2000-0026542 A | | 5/2000 |
| KR | 10-2001-0047592 A | | 6/2001 |
| KR | 20090092489 A | * | 9/2009 |
| KR | 10-2010-0081744 A | | 7/2010 |
| WO | WO 2005/094504 A2 | | 10/2005 |

OTHER PUBLICATIONS

JP H08-253828 machine translation (Year: 1996).*
JP H01-116057 machine translation (Year: 1989).*
CN 103194650 machine translation (Year: 2013).*
CN 101117677 machine translation (Year: 2008).*
Chinese Office Action dated Jun. 20, 2018.
European Search Report dated Nov. 28, 2018.
Akhtar et al., "Determination of gaseous impurities in zirconium and zirconium alloys", Jour. Chem. Soc. Pak., vol. 27, No. 1, 2005 (Year: 2005).

* cited by examiner

METHOD OF MANUFACTURING A CORROSION-RESISTANT ZIRCONIUM ALLOY FOR A NUCLEAR FUEL CLADDING TUBE

CROSS REFERENCE TO RELATED APPLICATION

This application is a divisional application of co-pending U.S. application Ser. No. 15/097,341, filed on Apr. 13, 2016. This application claims priority benefits under 35 U.S.C. § 1.119 to Korean Patent Application No. 10-2015-0052710 filed Apr. 14, 2015. The disclosures of these prior US and Korean applications are incorporated herein by reference.

BACKGROUND OF THE INVENTION

1. Field of the Invention

The present invention relates to a zirconium alloy for a nuclear fuel cladding tube and a method of manufacturing the same and, more particularly, to a zirconium alloy having excellent corrosion resistance, suitable for use in nuclear fuel cladding tubes and spacer grids for light and heavy water reactor nuclear power plants, and to a method of manufacturing the same.

2. Description of the Related Art

Typically, zirconium, having a low neutron absorption cross-section and superior corrosion resistance and mechanical properties, is provided in the form of an alloy containing small amounts of other elements, and is thus widely utilized as a material for nuclear fuel cladding tubes, supporting grids and structures in reactors.

With the goal of reducing nuclear fuel turnover in order to improve the economic efficiency of reactors, high-burnup nuclear fuel is receiving increased consideration these days. In the case where conventional Zircaloy-2 and Zircaloy-4 are used for nuclear fuel cladding tubes, corrosion may be accelerated, undesirably causing hydrogen brittleness and deteriorating mechanical properties.

Hence, there is an urgent need to develop a zirconium alloy having high corrosion resistance, and thorough research thereon is ongoing.

Since corrosion resistance and the mechanical properties of the zirconium alloy are highly variable depending on the kinds and amounts of alloy elements that are added and the type of manufacturing process, it is critical to optimize the elements for the alloy and the manufacturing process.

With regard to conventional techniques, U.S. Pat. No. 5,024,809 discloses a zirconium alloy having improved corrosion resistance, composed essentially of 0.5 to 2.0 wt % of Sn and 0.5 to 2.5 wt % of Bi, and including Mo, Nb, and Te, the sum of which is set to the range of 0.5 to 1.0 wt %, with the balance of Zr.

This alloy is designed as an inner zircaloy protection layer while being metallurgically bonded to an inner barrier layer of pure zirconium clad on a zirconium tube, and has a thickness corresponding to about 1 to 30% of that of the inner tube.

U.S. Pat. No. 5,017,336 discloses a zirconium alloy having improved corrosion resistance and mechanical properties, composed essentially of 0.2 to 0.9 wt % of Sn, 0.18 to 0.6 wt % of Fe, and 0.07 to 0.4 wt % of Cr, and including 0.05 to 1.0 wt % of Nb or 0.01 to 0.2 wt % of Ta, and 0.05 to 1.0 wt % of either or both of V and Mo, with the balance of Zr, wherein the amount of Sn is decreased, the amounts of Fe and Cr are increased, and the other alloy elements are added in small amounts.

U.S. Pat. No. 6,261,516 discloses a method of manufacturing a zirconium alloy from a mixture of Nb and Sn or from a mixture of Nb, Sn and Fe, wherein 0.8 to 1.2 wt % of Nb, 0.2 to 0.5 wt % of Sn, and 0.1 to 0.3 wt % of Fe are essentially contained, any one or more of Cr, Mo, Cu, and Mn is used in an amount of 0.1 to 0.3 wt %, and 80 to 120 ppm of Si, 600 to 1400 ppm of O, and the balance of Zr are used, whereby the solute elements, other than the essential elements, are contained in an amount of 0.3 wt % or less, while the amount of Sn is reduced, thus improving corrosion resistance.

This alloy was subjected to cold rolling two times at a reduction ratio of 45 to 50% at an interval of 0.5 mm for each pass, and final annealing was performed for 3 hr at 470° C., which is the stress relief annealing temperature.

U.S. Pat. No. 5,972,288 discloses an alloy having superior corrosion resistance, composed essentially of 0.05 to 0.3 wt % of Nb, 0.8 to 1.6 wt % of Sn, and 0.2 to 0.4 wt % of Fe, and including 0.05 to 0.2 wt % of at least one of V, Te, Sb, Mo, Ta, and Cu, 600 to 1400 ppm of O, and the balance of Zr.

This alloy was subjected to a series of processes, including annealing at 700° C., hot rolling at a reduction ratio of 70%, primary intermediate annealing at 700° C., primarily cold-rolled at a reduction ratio of 30%, secondary and tertiary annealing processes at 610° C., and two rolling processes.

Final annealing was performed for 3 hr at 480° C., which is the stress relief annealing temperature.

U.S. Pat. No. 6,325,966 discloses an alloy having superior corrosion resistance and mechanical properties, composed essentially of 0.15 to 0.25 wt % of Nb, 1.10 to 1.40 wt % of Sn, 0.35 to 0.45 wt % of Fe, and 0.15 to 0.25 wt % of Cr, and including 0.08 to 0.12 wt % of any one of Mo, Cu, and Mn, 1000 to 1400 ppm of O, and the balance of zirconium.

This alloy was subjected to a series of processes, including annealing at 700° C., hot rolling at a reduction ratio of 60%, primarily cold-rolled at a reduction ratio of 30%, secondarily cold-rolled at a reduction ratio of 50%, primary intermediate annealing at 680° C., and secondary intermediate annealing at 580° C.

Final annealing was performed at 505° C., which is the stress relief annealing temperature.

As is apparent from these techniques, various zirconium alloys, including Zircaloy-4, etc., suitable for use as a material for in-core instruments including nuclear fuel cladding tubes for nuclear power plants, have been devised.

However, nuclear power plants are currently used under severe operating conditions to improve the economic efficiency thereof, and thus limitations are imposed on the use of nuclear fuel cladding tubes made of Zircaloy-4, etc. Hence, research into zirconium alloys having improved corrosion resistance, which may ensure performance of nuclear fuel under operating conditions of high burn up/extended fuel cycles, is still ongoing.

CITATION LIST

Patent Literature (Patent Document 1) U.S. Pat. No. 5,024,809 (Registration Date: Jun. 18, 1991)
(Patent Document 2) U.S. Pat. No. 5,017,336 (Registration Date: May 21, 1991)

(Patent Document 3) U.S. Pat. No. 6,261,516 (Registration Date: Jul. 17, 2001) (Patent Document 4) U.S. Pat. No. 5,972,288 (Registration Date: Oct. 26, 1999)

(Patent Document 5) U.S. Pat. No. 6,325,966 (Registration Date: Dec. 4, 2001)

SUMMARY OF THE INVENTION

Therefore, the present invention has been made keeping in mind the problems encountered in the related art, and an object of the present invention is to provide a zirconium alloy having improved corrosion resistance for use in nuclear fuel cladding tubes and structural materials, and a method of manufacturing the same, wherein optimal annealing conditions are set by completely eliminating Sn, which negatively affects corrosion resistance, increasing the amount of Mo so that it is equal to or greater than a solubility limit.

In order to accomplish the above object, the present invention provides a zirconium alloy for a nuclear fuel cladding tube, comprising: 0.5 to 1.2 wt % of Nb, 0.4 to 0.8 wt % of Mo, 0.1 to 0.15 wt % of Cu, 0.15 to 0.2 wt % of Fe, and the balance of zirconium.

In addition, the present invention provides a method of manufacturing a zirconium alloy for a nuclear fuel cladding tube, comprising the steps of:

(1) melting a mixture of zirconium alloy elements, thus preparing an ingot; (2) subjecting the ingot prepared in step (1) to solution heat treatment at 1,000 to 1,050° C. (β) for 30 to 40 min and then to β-quenching using water; (3) preheating the ingot treated in step (2) at 630 to 650° C. for 20 to 30 min and subjecting the ingot to hot rolling at a reduction ratio of 60 to 65%; (4) subjecting the material hot-rolled in step (3), to primary intermediate vacuum annealing at 570 to 590° C. for 3 to 4 hr and then to primarily cold-rolled at a reduction ratio of 30 to 40%; (5) subjecting the material primarily cold-rolled in step (4), to secondary intermediate vacuum annealing at 560 to 580° C. for 2 to 3 hr and then to secondarily cold-rolled at a reduction ratio of 50 to 60%; (6) subjecting the material secondarily cold-rolled in step (5), to tertiary intermediate vacuum annealing at 560 to 580° C. for 2 to 3 hr and then to tertiarily cold-rolled at a reduction ratio of 30 to 40%; and (7) subjecting the material tertiarily cold-rolled in step (6), to final vacuum annealing.

As described above, in a zirconium alloy for use in nuclear fuel cladding tubes and a method of manufacturing the same according to the present invention, the kinds and amounts of alloy elements and the annealing temperatures are appropriately adjusted, whereby corrosion resistance superior to that of Zircaloy-4 can be exhibited, and furthermore, corrosion resistance even in a high-concentration Li atmosphere (70 ppm) is high. Hence, this zirconium alloy can be efficiently applied to cladding tubes and spacer grids for nuclear power plants.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
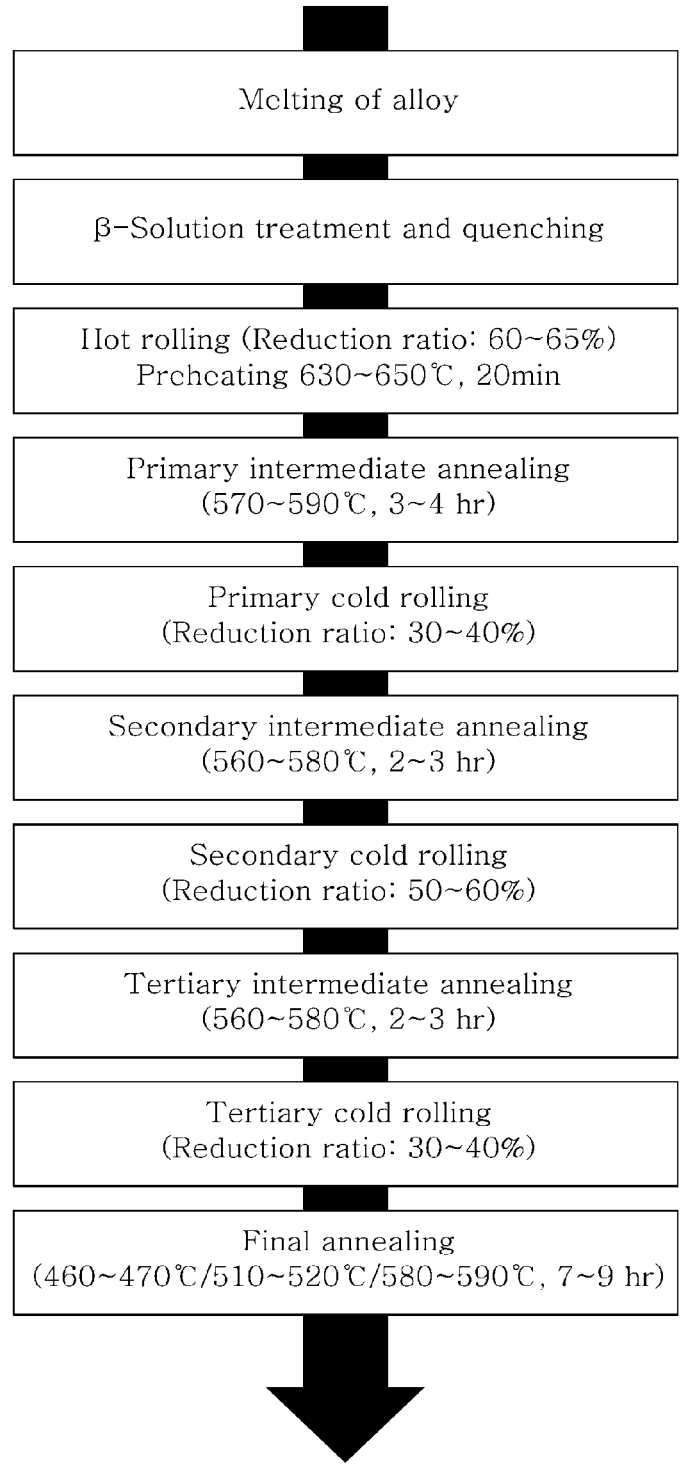
FIG. 1 illustrates the process of manufacturing a zirconium alloy for a nuclear fuel cladding tube according to the present invention.
Figure 2A:
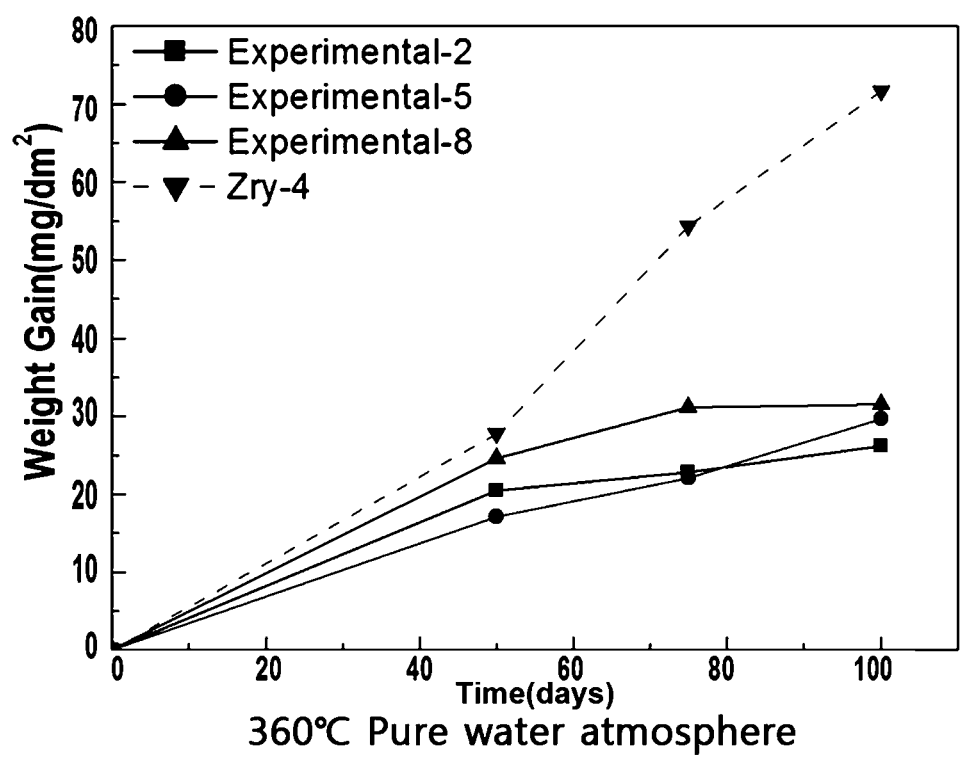
FIGS. 2A and 2B are graphs illustrating the weight gain over time in corrosion testing of the zirconium alloy according to the present invention.
Figure 2B:
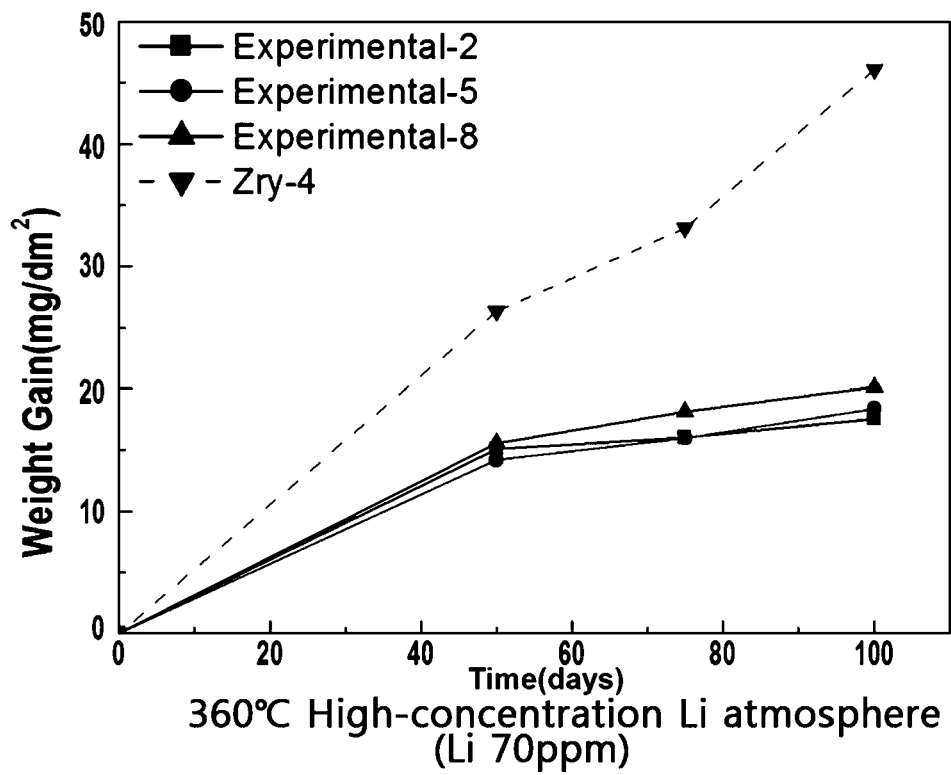

Hereinafter, a detailed description will be given of the present invention.

The present invention addresses a zirconium alloy for a nuclear fuel cladding tube, comprising: 0.5 to 1.2 wt % of Nb, 0.4 to 0.8 wt % of Mo, 0.1 to 0.15 wt % of Cu, 0.15 to 0.2 wt % of Fe, and the balance of zirconium.

Alternatively, the present invention addresses a zirconium alloy for a nuclear fuel cladding tube, comprising: 0.5 to 0.6 wt % of Nb, 0.4 to 0.5 wt % of Mo, 0.1 to 0.15 wt % of Cu, 0.15 to 0.2 wt % of Fe, and the balance of zirconium.

Alternatively, the present invention addresses a zirconium alloy for a nuclear fuel cladding tube, comprising: 1.1 to 1.2 wt % of Nb, 0.4 to 0.5 wt % of Mo, 0.1 to 0.15 wt % of Cu, 0.15 to 0.2 wt % of Fe, and the balance of zirconium.

Alternatively, the present invention addresses a zirconium alloy for a nuclear fuel cladding tube, comprising: 0.5 to 0.6 wt % of Nb, 0.7 to 0.8 wt % of Mo, 0.1 to 0.15 wt % of Cu, 0.15 to 0.2 wt % of Fe, and the balance of zirconium.

The preparation of the zirconium alloy having the above composition according to the present invention is described below.

The present invention addresses a method of manufacturing a zirconium alloy for a nuclear fuel cladding tube, comprising the steps of:

(1) melting a mixture of zirconium alloy elements, thus preparing an ingot; (2) subjecting the ingot prepared in step (1) to solution heat treatment at 1,000 to 1,050° C. (β) for 30 to 40 min and then to β-quenching using water; (3) preheating the ingot, annealed in step (2), at 630 to 650° C. for 20 to 30 min and subjecting the ingot to hot rolling at a reduction ratio of 60 to 65%; (4) subjecting the material hot-rolled in step (3), to primary intermediate vacuum annealing at 570 to 590° C. for 3 to 4 hr and then to primarily cold-rolled at a reduction ratio of 30 to 40%; (5) subjecting the material primarily cold-rolled in step (4), to secondary intermediate vacuum annealing at 560 to 580° C. for 2 to 3 hr and then to secondarily cold-rolled at a reduction ratio of 50 to 60%; (6) subjecting the material secondarily cold-rolled in step (5), to tertiary intermediate vacuum annealing at 560 to 580° C. for 2 to 3 hr and then to tertiarily cold-rolled at a reduction ratio of 30 to 40%; and (7) subjecting the material tertiarily cold-rolled in step (6), to final vacuum annealing.

A better understanding of the present invention may be obtained through the following examples.

<Examples 1 to 9> Preparation of Zirconium Alloys 1 to 9

Zirconium alloys were prepared using components in the amounts and through the annealing shown in Table 1 below, and the alloys were manufactured into alloy sheets through the following method.

The chemical compositions for the zirconium alloys and the final annealing temperatures are summarized in Table 1 below.

TABLE 1

| | Chemical Composition (wt %) | | | | | | | Final Annealing Temp. |
|---|---|---|---|---|---|---|---|---|
| | Nb | Sn | Mo | Fe | Cu | Cr | Zr | (° C.) |
| Ex. 1 | 0.5 | — | 0.4 | 0.2 | 0.1 | — | Balance | 460 |
| Ex. 2 | 0.5 | — | 0.4 | 0.2 | 0.1 | — | Balance | 520 |

TABLE 1-continued

| | Chemical Composition (wt %) | | | | | | Final Annealing Temp. |
| --- | --- | --- | --- | --- | --- | --- | --- |
| | Nb | Sn | Mo | Fe | Cu | Cr | Zr | (° C.) |
| Ex. 3 | 0.5 | — | 0.8 | 0.2 | 0.1 | — | Balance | 580 |
| Ex. 4 | 0.5 | — | 0.8 | 0.2 | 0.1 | — | Balance | 460 |
| Ex. 5 | 0.5 | — | 0.8 | 0.2 | 0.1 | — | Balance | 520 |
| Ex. 6 | 0.5 | — | 0.8 | 0.2 | 0.1 | — | Balance | 580 |
| Ex. 7 | 1.2 | — | 0.4 | 0.2 | 0.1 | — | Balance | 460 |
| Ex. 8 | 1.2 | — | 0.4 | 0.2 | 0.1 | — | Balance | 520 |
| Ex. 9 | 1.2 | — | 0.4 | 0.2 | 0.1 | — | Balance | 580 |
| C. Ex. 1 | — | 1.5 | — | 0.2 | — | 0.1 | Balance | Commercially available |

(1) Formation of Ingot

In step (1), zirconium alloy elements are formed into an ingot using VAR (Vacuum Arc Remelting).

In order to prevent the segregation of impurities and the non-uniform distribution of the alloy composition, this process is repeated about three times, and the alloy is melted under the condition that the chamber for VAR is maintained at a vacuum level of $10^{-5}$ torr or less, thus forming an ingot.

To prevent the surface of the sample from being oxidized during the cooling, cooling is performed in the presence of an inert gas such as argon.

The Zr that was used is zirconium sponge (Reactor Grade ASTM B349), and the added elements, such as Nb, Mo, Fe, Cu and the like, have a high purity of 99.99% or more.

(2) β-Solution Heat Treatment and β-Quenching

In step (2), the ingot is annealed in the β-range and then quenched using water so that the alloy composition in the prepared ingot is made homogenous and fine precipitates are obtained.

In order to prevent the oxidation of the ingot, the ingot is clad with a stainless steel plate having a thickness of 1 mm and then spot welded. The annealing is performed at 1,000 to 1,050° C. for about 30 to 40 min.

Also, β-quenching is performed so as to uniformly distribute the size of SPP (Secondary Phase Particles) in the matrix and to control the size thereof, and is carried out through water cooling at a cooling rate of about 300° C./sec or more.

(3) Annealing and Hot Rolling

In step (3), the β-quenched sample is subjected to hot rolling.

To this end, the sample is preheated at 630 to 650° C. for about 20 to 30 min, and then rolled at a reduction ratio of about 60 to 65%.

If the processing temperature falls out of the above range, it is difficult to obtain the rolled material suitable for use in subsequent step (4).

If the reduction ratio of hot rolling is less than 60%, the tissue of the zirconium material becomes non-uniform, undesirably deteriorating hydrogen brittleness resistance. On the other hand, if the reduction ratio is higher than 80%, subsequent processability may become problematic.

The material hot-rolled, is treated as follows: the clad stainless steel plate is removed, an oxide film and impurities are removed using a pickling solution comprising water, nitric acid and hydrofluoric acid at a volume ratio of 50:40:10, and the remaining oxide film is completely mechanically removed using a wire brush in order to facilitate subsequent processing.

(4) Primary Intermediate Annealing and Primary Cold Rolling

In order to remove residual stress after hot rolling and prevent damage to the sample upon primary cold processing, primary vacuum annealing is performed at about 570 to 590° C. for about 3 to 4 hr.

To prevent oxidation during the annealing, the sample is covered with a piece of stainless steel foil and the vacuum level is maintained at $10^{-5}$ torr or less.

The intermediate vacuum annealing is preferably carried out at a temperature elevated to a recrystallization annealing temperature. If the temperature falls out of the above range, corrosion resistance may deteriorate.

After completion of the primary intermediate vacuum annealing, the rolled material is subjected to primarily cold-rolled at a reduction ratio of about 40 to 50% at an interval of about 0.3 mm for each pass.

(5) Secondary Intermediate Vacuum Annealing and Secondary Cold Rolling

After completion of the primarily cold-rolled, the rolled material is subjected to secondary intermediate vacuum annealing at 560 to 580° C. for about 2 to 3 hr.

If the intermediate annealing temperature falls out of the above range, corrosion resistance may deteriorate.

After completion of the secondary intermediate vacuum annealing, the rolled material is subjected to secondarily cold-rolled at a reduction ratio of about 50 to 60% at an interval of about 0.3 mm for each pass.

(6) Tertiary Intermediate Vacuum Annealing and Tertiary Cold Rolling

After completion of the secondarily cold-rolled, the rolled material is subjected to tertiary intermediate vacuum annealing at 560 to 580° C. for 2 to 3 hr.

If the intermediate annealing temperature falls out of the above range, corrosion resistance may deteriorate.

After completion of the tertiary intermediate vacuum annealing, the rolled material is subjected to tertiarily cold-rolled at a reduction ratio of about 30 to 40% at an interval of about 0.3 mm for each pass.

(7) Final Vacuum Annealing

After completion of the tertiarily cold-rolled, the rolled material is finally annealed in a high vacuum of $10^{-5}$ torr or less.

Final annealing is performed for about 8 hr in three temperature ranges, including SRA (Stress Relief Annealing) at 460 to 470° C., PRXA (Partial Recrystallization Annealing) at 510 to 520° C., and RXA (Recrystallization Annealing) at 580 to 590° C.

<Comparative Example 1> Preparation of Zirconium Alloy

As a commercially available zirconium alloy for use in nuclear power plants, Zircaloy-4 was used.

<Test Example 1> Corrosion Resistance Testing

In order to evaluate the corrosion resistance of the zirconium alloy composition according to the present invention, corrosion testing was performed as follows.

Each of the zirconium alloys of Examples 1 to 9 was manufactured into a sheet sample through the above manufacturing process, which was then formed into a corrosion test sample having a size of 20 mm×20 mm×1.0 mm, followed by stepwise mechanical polishing using #400 to #1200 SiC abrasive paper.

After completion of the surface polishing, the sample was pickled using a solution comprising water, nitric acid and hydrofluoric acid at a volume ratio of 50:40:10, sonicated with acetone, and then completely dried in an oven for 24 hr or longer.

In order to determine the extent of corrosion of the alloy, the surface area and the initial weight of the alloy were measured before the alloy was loaded in an autoclave.

The loaded sample was subjected to corrosion testing for 100 days using a static autoclave at 360° C. in an 18.6 MPa pure water atmosphere and a 70 ppm Li atmosphere.

In the corrosion testing, the samples of Examples 1 to 9 and the Zircaloy-4 sample of Comparative Example 1 were placed in the autoclave together.

The samples were taken out a total of three times, i.e. 50 days, 75 days, and 100 days after the corrosion testing, and the weights thereof were measured, and the weight gains were calculated so as to quantitatively evaluate the extent of corrosion. The results are shown in Table 2 below.

TABLE 2

| | Weight Gain (mg/dm²) | | | | | |
|---|---|---|---|---|---|---|
| | 360° C., 2700 psi, Water | | | 360° C., 2700 psi, 70 ppm Li | | |
| | 50 days | 75 days | 100 days | 50 days | 75 days | 100 days |
| Ex. 1 | 17.0171 | 17.3227 | 18.5474 | 25.3438 | 31.7743 | 41.9875 |
| Ex. 2 | 15.0506 | 16.0417 | 17.5433 | 20.5044 | 22.7827 | 26.2001 |
| Ex. 3 | 14.2910 | 14.8125 | 18.5156 | 20.4824 | 23.1375 | 31.8615 |
| Ex. 4 | 14.7509 | 16.8371 | 18.1544 | 25.5202 | 39.0309 | 51.7910 |
| Ex. 5 | 14.1838 | 15.9509 | 18.3740 | 24.6221 | 31.1623 | 31.5470 |
| Ex. 6 | 12.7171 | 15.7901 | 16.9807 | 22.5986 | 26.1053 | 33.1187 |
| Ex. 7 | 14.1545 | 18.1708 | 21.2821 | 23.0809 | 23.8376 | 27.2430 |
| Ex. 8 | 15.5565 | 18.1167 | 20.1212 | 17.1323 | 22.0816 | 29.6960 |
| Ex. 9 | 14.0958 | 18.4966 | 20.3069 | 25.3782 | 28.4544 | 31.1460 |
| C. Ex. 1 | 26.3268 | 33.1276 | 46.0908 | 27.7393 | 54.3227 | 71.6597 |

As is apparent from Table 2, the zirconium alloys of Examples 1 to 9 according to the present invention were low in weight gain in both the water atmosphere and the 70 ppm Li atmosphere, compared to Zircaloy-4 of Comparative Example 1.

For corrosion properties in a pure water atmosphere after 100 days, Examples 1 to 9 manifested the weight gain ranging from 17 to 21 mg/dm², and Comparative Example 1 exhibited a significant weight gain, as large as 46 mg/dm². Hence, corrosion resistance was greatly improved when using the compositions of Examples 1 to 9 under the annealing conditions of Examples 1 to 9.

For corrosion properties in a Li atmosphere, the weight gain was greatly increased after 75 days in Comparative Example 1. After 100 days, the weight gain of Comparative Example 1 approximated 72 mg/dm², which is regarded as significantly different from 26 to 51 mg/dm², which was the weight gain of Examples 1 to 9 after 100 days.

Particularly in the Sn-free alloy containing Mo and Cu, corrosion resistance was high in both a pure water atmosphere and a high-concentration Li atmosphere under annealing conditions of 520° C. and 580° C.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a zirconium alloy having corrosion resistance for a nuclear fuel cladding tube, the method comprising steps of:
   (1) melting a mixture consisting of:
      0.5 wt % of Nb,
      0.4 wt % of Mo,
      0.1 to 0.15 wt % of Cu,
      0.15 to 0.2 wt % of Fe, and
      a balance of zirconium
      to prepare the zirconium alloy as a melted ingot;
   (2) solution heat treating the melted ingot at a temperature ranging from 1,000 to 1,050° C. for a time ranging from 30 to 40 min. followed by quenching in water to prepare a heat-treated ingot;
   (3) preheating the heat-treated ingot at a temperature ranging from 630 to 650° C. for a time ranging from 20 to 30 min. to prepare a preheated ingot followed by hot rolling the preheated ingot at a reduction ratio of 60 to 65% to provide a hot-rolled material;
   (4) vacuum annealing the hot-rolled material in a first vacuum annealing at a temperature ranging from 570 to 590° C. for a time ranging from 3 to 4 hrs. to prepare an annealed hot-rolled material followed by a first cold rolling at a reduction ratio of 30 to 40% to provide a first cold-rolled material;
   (5) vacuum annealing the first cold-rolled material in a second intermediate vacuum annealing at a temperature ranging from 560 to 580° C. for a time ranging from 2 to 3 hrs. followed by a second cold-rolling at a reduction ratio of 50 to 60% to provide a second cold-rolled material;
   (6) vacuum annealing the second cold-rolled material in a third intermediate vacuum annealing at a temperature ranging from 560 to 580° C. for a time ranging from 2 to 3 hrs. followed by a third cold-rolling at a reduction ratio of 30 to 40% to provide a third cold-rolled material; and
   (7) vacuum annealing the third cold-rolled material in a final vacuum annealing at a temperature ranging from 510 to 520° C. for a time ranging from 7 to 9 hrs. to provide the zirconium alloy as a cold-rolled material for a nuclear fuel cladding tube.

* * * * *